(12) United States Patent
Keller et al.

(10) Patent No.: US 6,992,125 B2
(45) Date of Patent: Jan. 31, 2006

(54) WAX FORMULATIONS AND THEIR USE FOR MAINTAINING AND PRESERVING SURFACES

(75) Inventors: Harald Keller, Ludwigshafen (DE); Thomas Frechen, Heidelberg (DE); Wolfgang Schrepp, Heidelberg (DE); Axel Ebenau, Limburgerhof (DE); Cedric Dieleman, Scheibenhard (FR); Silvio Alejandro Rosas Paz, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/726,662

(22) Filed: Dec. 4, 2003

(65) Prior Publication Data
US 2004/0110887 A1    Jun. 10, 2004

(30) Foreign Application Priority Data
Dec. 4, 2002   (DE) ............... 102 56 699

(51) Int. Cl.
*C08L 91/06*    (2006.01)
(52) U.S. Cl. ............... 524/277; 524/579; 524/430; 525/479

(58) Field of Classification Search ............... 524/277, 524/579, 430; 525/479
See application file for complete search history.

(56) References Cited

U.S. PATENT DOCUMENTS

| | | | |
|---|---|---|---|
| 3,393,078 A | | 7/1968 | Lockhart et al. |
| 3,856,533 A | | 12/1974 | Schnurrbusch et al. |
| 4,218,250 A | | 8/1980 | Kasprzak |
| 4,273,584 A | | 6/1981 | D'Angelo et al. |
| 4,398,953 A | | 8/1983 | van der Linde |
| 4,678,815 A | * | 7/1987 | Hoffman ............ 523/122 |
| 5,393,521 A | * | 2/1995 | Lance-Gomez et al. . 424/70.12 |
| 5,445,670 A | | 8/1995 | Each et al. |
| 6,462,009 B1 | | 10/2002 | Nagy et al. |

FOREIGN PATENT DOCUMENTS

| | | | |
|---|---|---|---|
| GB | 993794 | | 6/1965 |
| JP | 58-187444 | * | 11/1983 |
| JP | 62-154555 | * | 7/1987 |

* cited by examiner

*Primary Examiner*—Kuo-Liang Peng
(74) *Attorney, Agent, or Firm*—Novak Druce & Quigg; Jason D. Voight

(57) ABSTRACT

The present invention relates to wax formulations comprising a wax constituent a) plus at least one high molecular mass isobutene polymer b) in an amount of from 0.1 to 5 parts by weight per part by weight of constituent a).

21 Claims, No Drawings

WAX FORMULATIONS AND THEIR USE FOR MAINTAINING AND PRESERVING SURFACES

The present invention relates to new wax formulations, particularly in the form of polishes and cleaning products for smooth surfaces, and also to the use of the wax formulations for maintaining and/or preserving smooth surfaces.

On account of their capacity to form smooth, thin films with water repellency properties, waxes have long been used in compositions for maintaining and preserving surfaces, especially painted surfaces. They are therefore a regular ingredient of car polishes and similar compositions for maintaining and preserving smooth surfaces. In such compositions it has long been found useful to add silicone oils such as polydimethylsiloxane oils. These silicone oils act as lubricants for the wax particles and so make it easier to apply a uniform, thin wax film to the surface to be maintained/preserved. The silicone oils also intensify the water repellency properties of the surface thus treated and produce an improved luster. The wax films obtained using such compositions, however, are sensitive to the effects of weathering and of detergents. There have certainly been attempts to improve the weathering and detergent stability of wax films of this kind. For instance, there have been various proposals to use amino-functionalized polydimethylsiloxanes instead of their unfunctionalized counterparts. The use of these compositions results, however, in the surface having a reduced luster.

DE-C 2300245 recommends using a mixture of a conventional polydimethylsiloxane with a carbon-rich organosiloxane as a silicone oil component in surface polishes containing wax. DE-C 2936678 for its part recommends as a silicone oil component a mixture of a liquid cyclodimethylsiloxane and a polydimethylsiloxane containing polyether groups.

U.S. Pat. No. 3,393,078 discloses wax-containing surface polishes which comprise a montan wax, a microcrystalline wax, two silicone oils, each of different viscosity, and a volatile hydrocarbon.

According to U.S. Pat. No. 4,398,953 the water resistance of the wax films obtained can be enhanced by using a hydrocarbon which evaporates very much more rapidly than water. The detergent stability of the wax films obtained in this case, however, is not satisfactory.

U.S. Pat. No. 4,273,584 recommends replacing the wax by a complex mixture of hydroxy-terminated silicone oils, amino-functionalized polysiloxanes, and, if desired, partially hydrolyzed organotrialkylsilanes. Because of the ingredients, however, such compositions are very expensive.

None of the compositions disclosed in the prior art is convincing in terms of detergent stability.

It is an object of the present invention to provide a wax formulation which on application to a surface produces wax films which exhibit high detergent stability. The luster of the resultant coating should be at least comparable with that of conventional wax coatings.

We have found that this object is achieved by means of wax formulations which comprise at least one wax constituent a) plus at least one high molecular mass isobutene polymer constituent b) in an amount of from 0.1 to 5 parts by weight per part by weight of wax.

The present invention provides such wax formulations and also for their use for maintaining and preserving smooth surfaces, especially painted surfaces, such as are encountered, for example, on automobile bodies.

Maintaining and preserving are understood to refer to the protection of the surface against environmental effects by the application of the formulations of the invention to form a thin wax coat on the surface. Their application may be accompanied by a cleaning effect and the development of luster.

The term "high molecular mass isobutene polymer" is understood to encompass isobutene homopolymers and also copolymers containing predominantly, at more than 50% by weight and in particular at more than 80% by weight, isobutene. Suitable comonomers in the isobutene copolymers are usually hydrophobic, i.e., contain no amino groups, acid functions or alcohol functions and have a water solubility of less than 1 g/l (at 25° C.). Examples of suitable comonomers are monoethylenically unsaturated hydrocarbons, examples being non-isobutene 1-olefins having 3 to 30 carbon atoms, e.g., ethylene and propylene, vinylaromatic monomers such as styrene and α-methylstyrene, and also halogenated olefins such as tetrafluoroethylene, vinylidene chloride and vinyl chloride, and also vinyl ethers and allyl ethers having from three to thirty carbon atoms, e.g., methyl vinyl ether, ethyl vinyl ether, n-butyl vinyl ether, n-octyl vinyl ether, and octadecyl vinyl ether, esters of acrylic acid and of methacrylic acid with aliphatic alcohols having from two to twenty carbon atoms, such as ethyl acrylate, n-butyl acrylate, tert-butyl acrylate, n-hexyl acrylate, 2-ethylhexyl acrylate, stearyl acrylate, and the corresponding methacrylates. Preferred comonomers are the abovementioned monoethylenically unsaturated hydrocarbons, especially styrene, propylene and ethylene. In the isobutene copolymers the distribution of the comonomers can be random, blockwise or comblike. Particular preference is given to isobutene homopolymers (comonomer fraction <5% by weight and in particular <1% by weight).

The molecular weight (viscosity average $M_v$) of the high molecular mass isobutene polymers is generally above 100000 daltons, in particular above 500000 daltons, and especially above 1000000 daltons, and frequently up to 10000000. The molecular weight specified here refers to the viscosity average $M_v$, calculated from the Staudinger index $J_0$, determined by viscosimetry, in accordance with the formula $J_0 = 3.06 \times 10^{-2} \times (M_v)^{0.65}$.

The weight ratio of wax to isobutene polymer is preferably in the range from 5:1 to 1:2 and in particular in the range from 4:1 to 1:1.5.

The wax constituent suitably comprises basically all types of wax which are normally employed in wax formulations. Unlike the high molecular mass isobutene polymers, waxes melt, by definition, without decomposition at temperatures above 40° C., in the range from 50 to 120° C. for example. Suitable wax types include fossil waxes such as petroleum waxes, e.g. ozokerite, macrocristalline paraffin waxes, microcristalline paraffin waxes, montan waxes and chemical modifications thereof such as montan acid waxes and montan ester waxes, plant waxes such as carnauba wax, candelilla wax and the like, waxes of animal origin such as beeswax, lanolin and the like, and also semisynthetic waxes such as amide waxes, e.g., distearylethylenediamine, and also fully synthetic waxes such as polyolefin waxes, e.g., polyethylene and polypropylene waxes, Fischer-Tropsch waxes, fluoro waxes such as polytetrafluoroethylene and polyethylene-polytetrafluoroethylene copolymers, and also polyoxidates of Fischer-Tropsch waxes and of polyolefin waxes. Unlike the high molecular mass isobutene polymers the molecular weight of the waxes (weight average) is generally below 20000 daltons. The types of wax referred to above are well known to the skilled worker and are available commercially. An overview of waxes is given by U. Wolfmayer et al. in "Wachse", Ullmanns Encyclopedia of Industrial Chemistry, 5$^{th}$. Ed. on CD ROM, copyright 1997 Wiley-VCH, Weinheim.

In preferred embodiments of the invention the waxes used are montan waxes, especially montan acid and montan ester waxes, micro(crystalline) waxes, amide waxes, and mixtures thereof, and also mixtures of the aforementioned waxes with polytetrafluoroethylene waxes and with ethylene-polytetrafluoroethylene waxes.

In one embodiment the waxes are used in micronized form, that is, the maximum particle size, which is possessed by 90% of the wax particles, has a value below 20 µm.

In one embodiment of the invention wax component a) comprises hard waxes, i.e., waxes whose needle hardness (0.1 mm, DIN 51579) does not exceed a value of 50.

Besides constituents a) and b), the formulations of the invention preferably include at least one silicone oil or a mixture of two or more different silicone oils. Suitable silicone oils include the customary oligo(dialkyl)siloxanes such as polydimethylsiloxane and polyalkylhydrosiloxanes such as polymethylhydrosiloxane. These silicone oils may have the following groups G at their ends or as side chains: hydrogen, hydroxyl groups, $C_1$–$C_{20}$ alkyl groups, $C_1$–$C_{20}$ alkoxy groups, hydroxy-$C_2$–$C_4$ alkyl groups, carboxy-$C_1$–$C_{20}$ alkyl groups, amino-$C_1$–$C_{20}$ alkyl groups, glycidyl groups, isocyanato-$C_1$–$C_{20}$ alkyl groups, amino groups, N-(amino-$C_1$–$C_4$ alkyl)amino-$C_1$–$C_{20}$ alkyl groups, methylpolyoxyethylenealkyl groups, hydroxypolyoxyethylenealkyl groups, methylpolyoxyethylenepolyoxypropylene groups, hydroxypolyoxyethylene groups, polyoxyethylene groups, phenyl groups or perfluorinated $C_1$–$C_{20}$-alkyl groups. Examples of preferred groups G other than hydrogen are $C_1$–$C_4$ alkyl such as methyl or ethyl, OH, aminoalkyl such as $(CH_2)_{1-10}NH_2$, methylpolyoxyethylenealkyl groups such as $(CH_2)_3$—$(OCH_2CH_2)_{1-10}$—$OCH_3$, hydroxypolyoxyethylenealkyl groups such as $(CH_2)_3$—$(OCH_2CH_2)_{1-10}$—OH, and amino groups such as $NH_2$ and $N(CH_3)_2$. Polydimethylsiloxanes are generally composed predominantly of repeating units of the general formula (a), polymethylhydrosiloxanes predominantly of repeating units of the formula (b):

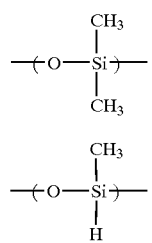

Where appropriate they contain one or more groups of the formula c:

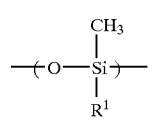

and end groups of the formulae d and/or e:

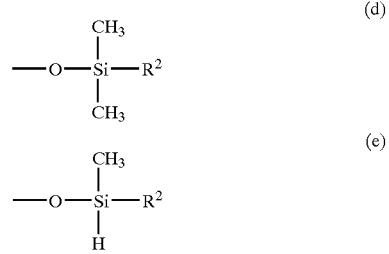

In these formulae $R^1$ is one of the aforementioned groups G other than hydrogen and methyl. $R^2$ is as defined for G.

Among the silicon oils a distinction is made between unfunctionalized silicone oils, amino-functionalized silicone oils, and other reactive silicone oils. Unfunctionalized silicone oils include polydimethylsiloxanes and polymethylhydrosiloxanes whose groups G, where present, are selected from hydrogen, $C_1$–$C_{20}$ alkyl, phenyl and perfluorinated alkyl. Amino-functionalized silicone oils normally have amino, N-(amino-$G_1$-cyanoalkyl)amino-$C_1$–$C_{20}$-alkyl and/or amino-$C_1$–$C_{20}$ alkyl groups G. Other reactive silicone oils have functional groups G which are able to enter into a crosslinking reaction when the formulation is dried after having been applied to a surface. These groups include OH groups, alkoxy groups, the hydroxy-$C_2$–$C_4$ alkyl groups which, as is known, hydrolyze to silanol groups; glycidyl groups, isocyanato-$C_1$–$C_{20}$ alkyl groups and the like.

The viscosity of the silicone oils is normally in the range from 10 to 20000 mm$^2$/s, in particular in the range from 100 to 10000 mm$^2$/s, and especially in the range from 100 to 5000 mm$^2$/s (determined, for example, in accordance with ASTM-D445). When a mixture of two or more silicone oils is used as component c) the viscosity of the mixture is normally within the aforementioned ranges.

Where desired the silicone oil c) is used in an amount of at least 0.1 part by weight, in particular at least 0.2 part by weight, and especially at least 0.5 part by weight per part by weight of the total amount of constituents a) and b). In particular the weight ratio of silicon oil c) to the total amount of constituents a) and b) is in the range from 2:1 to 1:5 and especially in the range from 1.5:1 to 1:2.

Silicone oils are well known from the prior art (overview by H. Moretto et al. "Silicones" in Ullmanns Encyclopedia of Industrial Chemistry, Fifth Ed. on CD ROM, ©1997 Wiley-VCH, Weinheim, Chapter 3) and are available commercially, for example, from the companies Rhodia, Geleste ABCR, Wacker, General Electric and Dow Corning.

In a first preferred embodiment use is made as silicone constituents c) of a mixture of at least one silicone oil of low viscosity, in the range for example from 10 to 1000 and in particular from 50 to 500 mm$^2$/s, and a silicone oil of higher viscosity, having a viscosity for example of from 1000 mm$^2$/s to 20000 mm$^2$/s and in particular in the range from 1000 to 10000 mm$^2$/s. The weight ratio of the two silicone oils is in the range from 1:10 to 10:1 and in particular in the range from 1:5 to 5:1.

In another preferred embodiment use is made as constituent c) of a mixture of at least one nonfunctionalized silicone oil (G=H, alkyl, perfluoroalkyl or phenyl) and one amino-functionalized silicone oil. The weight ratio of nonfunctionalized to amino-functionalized silicone oil is in this case preferably in the range from 10:1 to 1:5 and in particular in the range from 5:1 to 1:2.

Further suitable constituents c) include reactive silicone oils which are not amino-functionalized, and also mixtures thereof with unfunctionalized and/or amino-functionalized silicone oils, e.g., mixtures comprising amino-functionalized silicone oils with silicone oils containing an oxirane group and/or an isocyanate group and/or carboxylate group, silicone oils containing Si-bonded alkoxy groups or Si—OH groups, and mixtures thereof with unfunctionalized silicone oils.

The composition of the invention may further comprise as component d) a finely divided powder whose particles have a porous structure characterized by a BET surface area (determined in accordance with DIN 66131) of at least 1 $m^2/g$, preferably at least 10 $m^2/g$, in particular at least 20 $m^2/g$, and especially 50 $m^2/g$. The BET surface area will normally not exceed a limit of 1000 $m^2/g$ and in particular 800 $m^2/g$. Characteristic of such substances is the aggregate structure of the powder particles. Particles with an aggregate structure are understood to be formed by a multiplicity of very fine primary particles having diameters in the range from 1 to 500 nm, in particular from 2 to 100 nm, and especially from 2 to 50 nm. Examples of finely divided materials with a porous structure are amorphous metal oxides and semimetal oxides, especially pyrogenic (semi) metal oxides such as pyrogenic silica, pyrogenic titanium dioxide, pyrogenic alumina, and precipitated silica. In one preferred embodiment the surface of these finely divided porous materials has been hydrophobically modified—that is, the surface has a multiplicity of alkyl and/or (per) fluoroalkyl groups. Particularly preferred constituents d) are pyrogenic (semi)metal oxides with a hydrophobicized surface, especially hydrophobicized pyrogenic silica. Materials of this kind are very familiar to the skilled worker and have been comprehensively described in the prior art, for example, by O. W. Flörke et al. "Silica" in Ullmanns Encyclopedia of Industrial Chemistry, $5^{th}$ Ed. on CD ROM, ©1997 Wiley-VCH, Weinheim. Where desired, constituent d) is used in an amount of from 1 to 100% by weight, in particular from 5 to 50% by weight, based on the total amount of constituents a) and b).

One preferred embodiment of the composition of the invention are polish compositions. These comprise, besides constituents a) to d), a finely divided, preferably oxidic, polishing agent or abrasive (constituent e). Suitable polishing agents and abrasives are known from the prior art. They serve primarily to remove dirt and deposits from the target surface that cannot be removed simply by washing. Suitable polishing agents and abrasives include aluminum silicates such as kaolin, pumice, bentonite, siliceous earths, e.g. diatomaceous earth, colloidal silica, earth alkaline silicates such as magnesium silicate and calcium silicate, and the like. The fraction of abrasive constituents e) in the compositions of the invention, where desired, is preferably in the range from 1 to 200% by weight and in particular in the range from 10 to 100% by weight, based on the total weight of constituents a)+b). The nature of the abrasive depends in a manner known per se on the nature of the surface to be preserved/maintained, the usual approach being to choose a mild abrasive or a mixture of different abrasives having abrasive index $\leq 1.05$ in the case of glossy surfaces, e.g., clear-coated paintwork.

Besides the abovementioned constituents, the formulation of the invention may also comprise one or more organic solvents, liquid paraffins (constituent f) and/or water. Among the organic solvents preference is given to those which dissolve the wax component a) and the isobutene polymer component b). Examples of suitable solvents include ketones such as acetone and ethyl methyl ketone, aliphatic and cycloaliphatic hydrocarbons and mixtures thereof, examples being petroleum fractions, aromatic hydrocarbons such as toluene, lower alkyl esters of aliphatic carboxylic acids, such as ethyl acetate and n-butyl acetate, ethers such as diethyl ether, tert-butyl methyl ether, and tetrahydrofuran and the like.

The compositions of the invention can be formulated as liquids, as semisolid pastes and creams, as sprays, and as foams. These formulations may be based on solutions and also on dispersions of constituents a) to e) in organic solvents and also on aqueous systems such as water-in-oil and oil-in-water emulsions. Accordingly, in addition to the aforementioned constituents a) to e), the solvent constituent f), and water constituent g) where appropriate, the compositions may further comprise the additives which are customary for the particular type of formulation. Examples of additives are, in particular, surface-active substances such as emulsifiers and dispersing assistants, colorants, preservatives, thickeners, stabilizers, and the like.

One preferred embodiment of the invention provides aqueous formulations, in particular in the form of an oil-in-water emulsion or of a water-in-oil emulsion, of the water-insoluble constituents a) to e). Such compositions frequently include at least one water-immiscible organic solvent and/or at least one liquid paraffin as a further constituent (constituent f). Particular examples of water-immiscible organic solvents are the aforementioned aliphatic and cycloaliphatic hydrocarbons, aromatic hydrocarbons, and mixtures thereof. The amount of constituent f) is normally from 1 to 60% by weight, in particular from 10 to 60% by weight, based on the total weight of the composition.

To stabilize the oily and aqueous phases the aqueous formulations frequently also include the surface-active substances that are customary for this purpose. Examples of suitable surface-active substances are the salts of fatty acids, especially $C_{11}$–$C_{22}$ fatty acids such as stearic acid and oleic acid, in particular their ammonium salts and their salts with primary, secondary or tertiary amines, it being possible to prepare the fatty acid salts in situ from fatty acid and base, e.g. amine, and, furthermore, neutral surface-active substances such as the ethoxylation products of long-chain alcohols, e.g., the ethoxylation products of $C_8$–$C_{30}$ alkanols having a degree of ethoxylation of from 5 to 100, in particular from 10 to 50, fatty acid esters of unethoxylated or ethoxylated polyols such as glycerol or sorbitan, examples being sorbitan monostearate and sorbitan monopalmitate, and also ethoxylated sorbitan monostearate and ethoxylated sorbitan monopalmitate with degrees of ethoxylation in the range from 2 to 100. The amount of surface-active substances is generally in the range from 0.5 to 20% by weight and in particular from 1 to 10% by weight, based on the total amount of constituents a) to f).

An aqueous formulation of the invention contains for example a) 0.2 to 10% by weight, especially 0.5 to 6% by weight, of wax constituents;

b) 0.2 to 10% by weight, in particular 1 to 5% by weight of at least one high molecular mass isobutene polymer;

c) 0.5 to 20% by weight, in particular 1 to 12% by weight, of at least one silicone oil;

d) 0 to 5% by weight, for example, 1 to 5% by weight, of one or more finely divided oxide materials having a porous structure characterized by a BET surface area of at least 1 $m^2/g$;

e) 0 to 15% by weight, for example 1 to 15% by weight, of one or more finely divided customary polishing agents and/or abrasives;
f) 5 to 60% by weight, in particular 10 to 60% by weight, of one or more water-immiscible organic solvents and/or liquid paraffins; and
g) 10 to 93% by weight, in particular 20 to 80% by weight, of water, based in each case on the total weight of components a) to g).

Application of the formulations of the invention to the surfaces to be maintained and/or preserved is accomplished in a manner specific to the particular application using customary application techniques, examples being rubbing in, spreading, spraying, dipping, and the like. Evaporation of the volatile constituents present in the formulations leaves an impervious film of wax on the surface to be preserved. After the film has solidified the surface can be polished in customary fashion, giving very thin, lustrous, and well-adhering wax films on the surface. These wax films are notable for particularly high resistance to chemicals, environmental effects, and in particular to aqueous detergents. The compositions of the invention are accordingly suitable in particular for maintaining and preserving painted surfaces, particularly for bodywork surfaces.

The examples below are intended to illustrate the invention though without restricting it.

Ingredients Used

Commercial car polish (Nigrin Lackschutz, Kern Viktor GmbH, Vienna (Austria)

Polyisobutene 1: molecular weight $4.7 \times 10^6$ g/mol, viscosity average;

Polyisobutene 2: molecular weight $5.9 \times 10^6$ g/mol, viscosity average;

Hydrophobicized pyrogenic silica (BET surface area: 225 $m^2/g$ to DIN 66131; Aerosil®)

Silicone oil 1: polydimethylsiloxane (viscosity 1000 $mm^2/s$)

Silicone oil 2: amino-functionalized silicone oil (Dow Corning Fluid 531)

White spirit: boiling range 100 to 140° C.

Montan acid wax: Luwax® LS, (BASF Aktiengesellschaft)

Sorbitan monopalmitate: Span® 80, Uniquema

Liquid paraffin: Norpar 13 Fluid, Exxon Mobil Chemical;

Micronized amide wax: Ceridust® 3910, Clariant;

Polytetrafluoroethylene wax: Ceridust® 9205 F, Clariant;

Polishing agent: Diatomaceous earth (Snow Floss®, Lehmann und Voss, Hamburg).

EXAMPLE 1

500 g of a conventional polish were admixed with 1.5 g of the above-identified polyisobutene 1 and the mixture was heated to 90° C. The mixture was stirred at this temperature for 24 hours. It was then cooled with stirring.

EXAMPLE 2

Prepared as for Example 1 with the further addition of 0.7 g of hydrophobicized pyrogenic silica.

EXAMPLE 3 (COMPARATIVE)

2.4 g of montan acid wax, 1.0 g of oleic acid, 3.0 g of silicone oil 1, 1.0 g of silicone oil 2 and 43.5 g of white spirit were heated to 80° C. with stirring. 0.8 g of morpholine and 44.6 g of water heated to 80° C. were added to the first mixture. The resulting mixture was stirred intensively for 45 minutes and then cooled to room temperature.

EXAMPLE 4

Prepared as for Example 3, using the following ingredients:
2.0 g montan acid wax,
1 g oleic acid
2.0 g silicone oil 1
1.0 g silicone oil 2
2.0 g polyisobutene 1
43.5 g white spirit
0.8 g morpholine
44.6 g water.

EXAMPLE 5

Prepared as for Example 3, using the following ingredients:
1.6 g montan acid wax,
1 g olein
1.5 g silicone oil 1
1.0 g silicone oil 2
2.0 g polyisobutene 1
0.5 g hydrophobicized pyrogenic silica
43.5 g white spirit
0.8 g morpholine
44.6 g water.

EXAMPLE 6 (COMPARATIVE)

0.5 g of sorbitan monopalmitate and 3.5 g of silicone oil were stirred into 15.0 g of liquid paraffin. 5.0 g of micronized amide wax and 1.0 g of polytetrafluoroethylene wax were added with stirring. 75 g of demineralized water were added with stirring, and stirring was continued for 30 minutes.

EXAMPLE 7

0.5 g of sorbitan monopalmitate, 3.5 g of silicone oil 1 and 2.0 g of polyisobutene 2 were stirred into 15.0 g of liquid paraffin. 4.0 g of micronized amide wax and 1.0 g of polytetrafluoroethylene wax were added with stirring. 75 g of demineralized water were added with stirring, and stirring was continued for 30 minutes.

EXAMPLE 8

0.5 g of sorbitan monopalmitate, 2.5 g of silicone oil 1, 2.0 g of polyisobutene 2 and 0.9 g of hydrophobicized pyrogenic silica were stirred into 15.0 g of liquid paraffin. 4.0 g of micronized amide wax and 0.8 g of polytetrafluoroethylene wax were added with stirring. 75 g of demineralized water were added with stirring, and stirring was continued for 30 minutes.

EXAMPLE 9 (COMPARATIVE)

2.4 g of montan acid wax, 1.0 g of oleic acid, 3.0 g of silicone oil 1, 1.0 g of silicone oil 2 and 43.5 g of white spirit were heated to 80° C. with stirring. 0.8 g of morpholine and 44.6 g of water heated to 80°C. were added to the first mixture. The resulting mixture was stirred intensively for 45 minutes, 3.5 g of a commercial polishing agent (calcined diatomaceous earth, Snow Floss®) were added to the hot emulsion, and the resulting formulation was then cooled to room temperature.

EXAMPLE 10

Prepared as for Example 9, using the following ingredients:

2.0 g montan acid wax,
1 g oleic acid
2.0 g silicone oil 1
1.0 g silicone oil 2
2.0 polyisobutene 1
43.5 g white spirit
0.8 g morpholine
44.6 g water.
2.9 g Snow Floss®

EXAMPLE 11

Prepared as for Example 9, using the following ingredients:

1.6 g montan acid wax,
1 g oleic acid
1.5 g silicone oil 1
1.0 g silicone oil 2
2.0 polyisobutene 1
0.5 g hydrophobized pyrogenic silica
43.5 g white spirit
2.9 g Snow Floss®
0.8 g morpholine
44.6 g water.

Peformance Testing:

The wax formulations of the reference examples and the standard commercial polish were applied to the left-hand half of 2 VW Polo automobiles painted dark blue, while on the right-hand side of the same automobiles the formulation of the invention, corresponding to the reference, was applied.

For this test, the automobiles were first cleaned in a car wash. The formulations were then applied thinly to the paint using a soft cloth. After drying (about 60 minutes) excess formulation was removed with a car polishing cloth and the paint was then polished to a luster.

Thereafter the automobiles were used in the usual way and cleaned once a week in a car wash. After each run through the car wash the hydrophobicity of the paintwork was assessed. This was done by pouring 5 liters of water over the automobile and assessing the runoff behavior visually on a scale from 1 to 4:

4=very good beading and runoff of water, no residues of water,

3=good beading and runoff of water, some residues of water on roof and hood;

2=poor beading and slow runoff of water, residues of water on roof, hood, and wings;

1=runoff of the water as on an untreated automobile.

The results are shown in the following table:

TABLE 1

| | Water beading behavior | | | |
|---|---|---|---|---|
| | 4 Weeks | 8 Weeks | 16 Weeks | 32 Weeks |
| Standard commercial paint protection | 4 | 4 | 3 | 1 |
| Example 1 | 4 | 4 | 4 | 3 |
| Example 2 | 4 | 4 | 4 | 4 |
| Example 3 (Reference) | 4 | 3 | 2 | 1 |
| Example 4 | 4 | 4 | 4 | 3 |
| Example 5 | 4 | 4 | 4 | 4 |
| Example 6 (Reference) | 4 | 3 | 1 | 1 |
| Example 7 | 4 | 4 | 4 | 1 |
| Example 8 | 4 | 4 | 4 | 3 |
| Example 9 (Reference) | 4 | 3 | 2 | 1 |
| Example 10 | 4 | 4 | 4 | 3 |
| Example 11 | 4 | 4 | 4 | 4 |

We claim:

1. A wax formulation comprising
   as constituent a) at least one wax constituent,
   as constituent b) at least one isobutene polymer constituent, and
   as constituent d) at least one finely divided oxide material with a porous structure characterized by a BET surface area of at least 1 $m^2/g$,
   the constituent b) being present in an amount of from 0.1 to 5 parts by weight per part by weight of constituent a), and the constituent b) being a hydrophobic homo- or copolymer of isobutene having an isobutene content of more than 80% by weight and having a molar mass (weight average) of at least 500000.

2. A formulation as claimed in claim 1, wherein the isobutene polymer is a homopolymer of isobutene.

3. A formulation as claimed in claim 1, further comprising a silicone oil constituent c).

4. A formulation as claimed in claim 3, wherein the weight ratio of silicone oil to the total amount of constituents a) and b) is in the range from 5:1 to 1:10.

5. A formulation as claimed in either of claim 3, wherein the silicone oil has a viscosity in the range from 10 to 20000 $mm^2/s$ (at 25° C.).

6. A formulation as claimed in claim 1, containing constituent d) in an amount of from 1 to 50% by weight, based on the total amount of constituents a) and b).

7. A formulation as claimed in claim 1 in the form of a polish formulation comprising at least one abrasive constituent e).

8. A formulation as claimed in claim 1 in the form of an oil/water emulsion.

9. A formulation as claimed in claim 8, further comprising a water-immiscible organic solvent and/or liquid paraffin constituent f).

10. A formulation as claimed in claim 8, containing
    a) from 0.2 to 10% by weight of wax;
    b) from 0.2 to 10% by weight of at least one isobutene polymer
    c) from 0.5 to 20% by weight of at least one silicone oil
    d) from 1 to 100% by weight, based on the total amount of constituents a) and b), of one or more finely divided oxide materials with a porous structure characterized by a BET surface area of at least 1 $m^2/g$
    e) from 0 to 15% by weight of one or more finely divided polishing agents and/or abrasives f) from 5 to 60% by weight of one or more water-immiscible organic solvents or liquid paraffins and g) from 10 to 93% by weight of water, based in each case on the total weight of constituents a) to g).

11. A method of maintaining and preserving smooth surfaces, that method comprising applying a wax formulation to a smooth surface, said wax formulation comprising as constituent a) at least one wax constituent, and as constituent b) at least one isobutene polymer constituent, the constituent b) being present in an amount of from 0.1 to 5 parts by weight per part by weight of constituent a), and the constituent b) being a hydrophobic homo- or copolymer of isobutene having an isobutene content of more than 80% by weight and having a molar mass (weight average) of at least 500000.

12. The method as claimed in claim 11, wherein the isobutene polymer is a homopolymer of isobutene.

13. The method as claimed in claim 11, wherein the wax formulation further comprises a silicone oil constituent c).

14. The method as claimed in claim 13, wherein the weight ratio of silicone oil to the total amount of constituents a) and b) is in the range from 5:1 to 1:10.

15. The method as claimed in claim 13, wherein the silicone oil has a viscosity in the range from 10 to 20000 mm$^2$/s (at 25° C).

16. The method as claimed in claim 11, wherein the wax formulation further comprises as a constituent d) at least one finely divided oxide material with a porous structure characterized by a BET surface area of at least 1 m$^2$/g.

17. The method as claimed in claim 16, wherein the wax formulation contains constituent d) in an amount of from 1 to 50% by weight, based on the total amount of constituents a) and b).

18. The method as claimed in claim 11, wherein the wax formulation is in the form of a polish formulation comprising at least one abrasive constituent e).

19. The method as claimed in claim 11, wherein the wax formulation is in the form of an oil/water emulsion.

20. The method as claimed in claim 19, wherein the wax formulation further comprises a water-immiscible organic solvent and/or liquid paraffin constituent f).

21. The method as claimed in claim 19, wherein the wax formulation contains a) from 0.2 to 10% by weight of wax;

b) from 0.2 to 10% by weight of at least one isobutene polymer c) from 0.5 to 20% by weight of at least one silicone oil d) from 0 to 5% by weight of one or more finely divided oxide materials with a porous structure characterized by a BET surface area of at least 1 m$^2$/g e) from 0 to 15% by weight of one or more finely divided polishing agents and/or abrasives f) from 5 to 60% by weight of one or more water-immiscible organic solvents or liquid paraffins and g) from 10 to 93% by weight of water, based in each case on the total weight of constituents a) to g).

* * * * *